United States Patent [19]

Fujiwara

[11] Patent Number: 5,301,222
[45] Date of Patent: Apr. 5, 1994

[54] PORTABLE RADIO TELEPHONE SET FOR GENERATING PATTERN SIGNALS REPRESENTATIVE OF ALPHANUMERIC LETTERS INDICATIVE OF A TELEPHONE NUMBER

[75] Inventor: Ryuhei Fujiwara, Tokyo, Japan
[73] Assignee: NEC Corporation, Japan
[21] Appl. No.: 644,915
[22] Filed: Jan. 23, 1991

[30] Foreign Application Priority Data

Jan. 24, 1990 [JP] Japan .................... 2-14246

[51] Int. Cl.⁵ .................... H04M 11/00; H04M 1/00
[52] U.S. Cl. .................... 379/58; 379/96; 379/368
[58] Field of Search .................... 379/58, 56, 61, 88, 379/91, 62, 59, 357, 368, 96; 455/88; 340/712, 825.44

[56] References Cited

U.S. PATENT DOCUMENTS

| | | | |
|---|---|---|---|
| 4,734,858 | 3/1988 | Schlafly | 379/91 |
| 4,817,136 | 3/1989 | Rhoads | 379/357 |
| 4,850,009 | 7/1989 | Zook et al. | 379/96 |
| 4,868,849 | 9/1989 | Tamaoki | 379/357 |
| 4,916,441 | 4/1990 | Gombrich | 340/712 |
| 4,969,180 | 11/1990 | Watterson et al. | 379/58 |
| 5,099,507 | 3/1992 | Mulcai et al. | 379/57 |
| 5,117,455 | 5/1992 | Danish | 379/368 |
| 5,119,414 | 6/1992 | Izumi | 379/157 |

FOREIGN PATENT DOCUMENTS

| | | |
|---|---|---|
| 0094867 | 11/1983 | European Pat. Off. |
| 0317496 | 5/1989 | European Pat. Off. |
| 0388075 | 10/1989 | European Pat. Off. |

OTHER PUBLICATIONS

Free, "Personal Pocket Phones", Popular Science Aug. 1990.

Primary Examiner—Curtis Kuntz
Assistant Examiner—William D. Cumming
Attorney, Agent, or Firm—Ostrolenk, Faber, Gerb & Soffen

[57] ABSTRACT

A portable radio telephone set comprises a telephone number generating apparatus and a telephone number transmitting apparatus which are preferably contained in a pencil shaped body. The telephone number generating means generates a telephone number signal, for instance, by sensing the motion of a ball provided on a lower end of the body. The ball is moved to draw a telephone number on a surface of an article. The telephone number signal is modulated in the telephone number transmitting apparatus to be transmitted to air by an antenna which is provided on an upper end of the body.

8 Claims, 6 Drawing Sheets

ND LETTERS INDICATIVE OF A TELEPHONE
NUMBER

FIELD OF THE INVENTION

This invention relates to a portable radio telephone set, and more particularly to an improvement of a dial unit in a portable radio telephone set.

BACKGROUND OF THE INVENTION

In general, a portable radio telephone set comprises a dial operation unit having a plurality of push buttons for generating a calling signal and a telephone number signal of a called party. In this portable radio telephone set, a calling party presses the selected push buttons in turn to generate a telephone number signal which is supplied to a control unit of the telephone set, so that the telephone set of the calling party is connected through a communication channel to a telephone set of the called party.

A portable radio telephone set having a voice recognition apparatus has also been proposed. In this portable radio telephone set, a calling party voices a telephone number of a called party by facing the telephone set, so that the voice recognition apparatus recognizes the voice of the calling party and generates a telephone number signal of the called party. Consequently, the telephone set of the calling party is connected through a communication channel to a telephone set of the called party.

However, the former portable radio telephone set has a disadvantage in that a limitation occurs in the amount the size of the telephone set can be reduced, because the plural push buttons must be provided on a main body of the telephone set to generate a telephone number signal.

In addition, the latter portable radio telephone set has a disadvantage in that it is difficult to dial a telephone number of the called party in a confidential manner, because the telephone number is voiced at a predetermined voice level by the calling party.

SUMMARY OF THE INVENTION

Accordingly, it is an object of the invention to provide a portable radio telephone set having fewer obstacles to in making the size of the telephone set small.

It is a further object of the invention to provide a portable radio telephone set, in which a telephone number of a called party is dialed in a confidential manner.

According to this invention, a portable radio telephone set, comprises:
generating pattern signals representative of alphanumeric letters indicative of a telephone number;
a memory for storing patterns representative of alphanumeric letters;
means for comparing the patterns signal and the stored patterns to generate a coincidence signal when the pattern signal corresponds to the stored pattern; and
means for transmitting a telephone number signal in response to the coincidence signals.

BRIEF DESCRIPTION OF THE DRAWINGS

This invention will be explained in more detail in conjunction with the appended drawings, wherein.

DESCRIPTION OF THE PREFERRED EMBODIMENT

Figure 1:
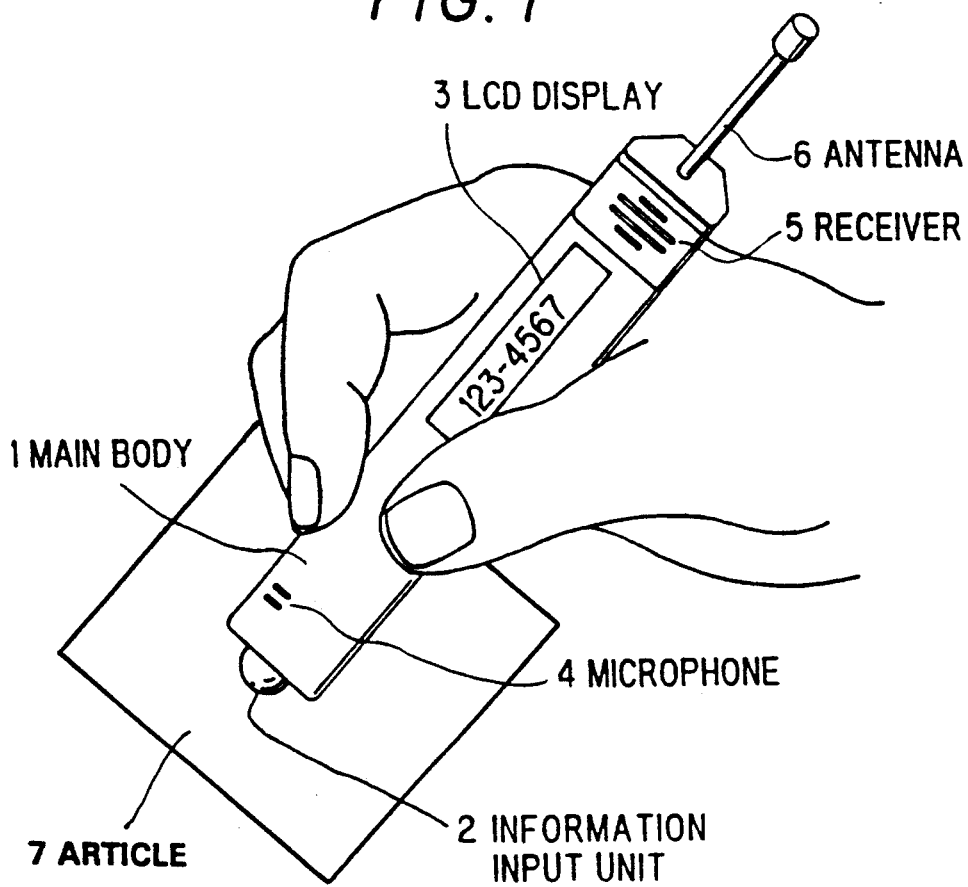
FIG. 1 is a perspective view showing a portable radio telephone set in a preferred embodiment according to the invention.

FIG. 1 shows a portable radio telephone set in a preferred embodiment according to the invention. The portable radio telephone set comprises a main body 1 of a pencil shape which is provided at a first end with an information input unit 2 and at a second end with an antenna 6, an LCD display 3 at the approximately central portion of the main body 1, a microphone 4 in the vicinity of the first end, and a receiver 5 in the vicinity of the second end. This portable radio telephone set is held in operation by a hand of a calling party or a called party.

Figure 2:
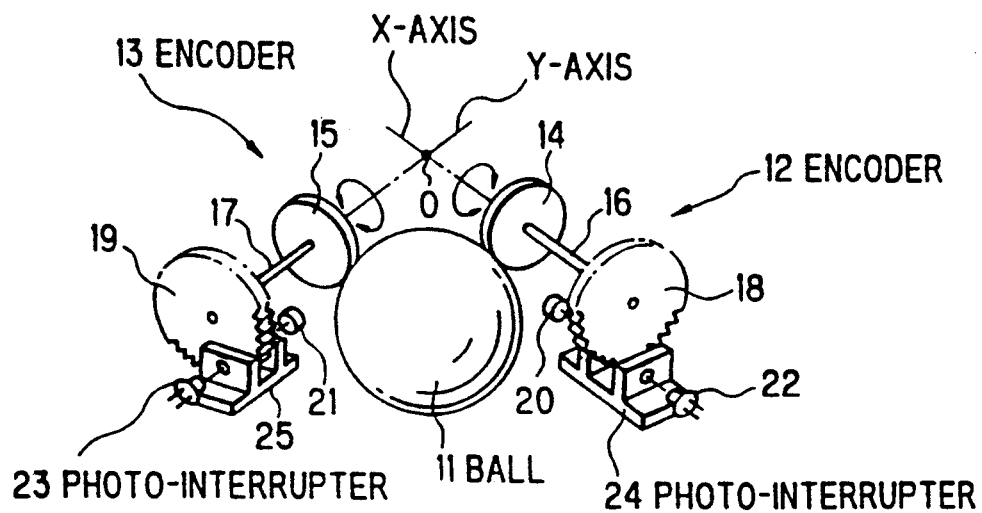
FIG. 2 is an enlarged perspective view showing an information input unit in the portable radio telephone set in the preferred embodiment.

FIG. 2 shows the information input unit 2 which comprises a ball 11 rotating in an arbitrary direction, and X- and Y- direction rotary encoders 12 and 13 having X- and Y- axes intersecting orthogonal to each other at an origin 0. The encoders 12 and 13 comprise rollers 14 and 15 which are in contact to be rotated with the ball 11, gears 18 and 19 connected to the rollers 14 and 15 by rotary shafts 16 and 17, and photo-interruptors 24 and 25 for generating signals indicative of moving distances of the ball 11 in the X-and Y- directions by cooperation with the gears 18 and 19, respectively. The photo-interruptors 24 and 25 comprise LEDs 20 and 21 for emitting lights, and phototransistors 22 and 23 for receiving the lights passing through portions having no teeth on the outer peripheries of the gears 18 and 19 to generate the moving distance signals, respectively.

Figure 3:
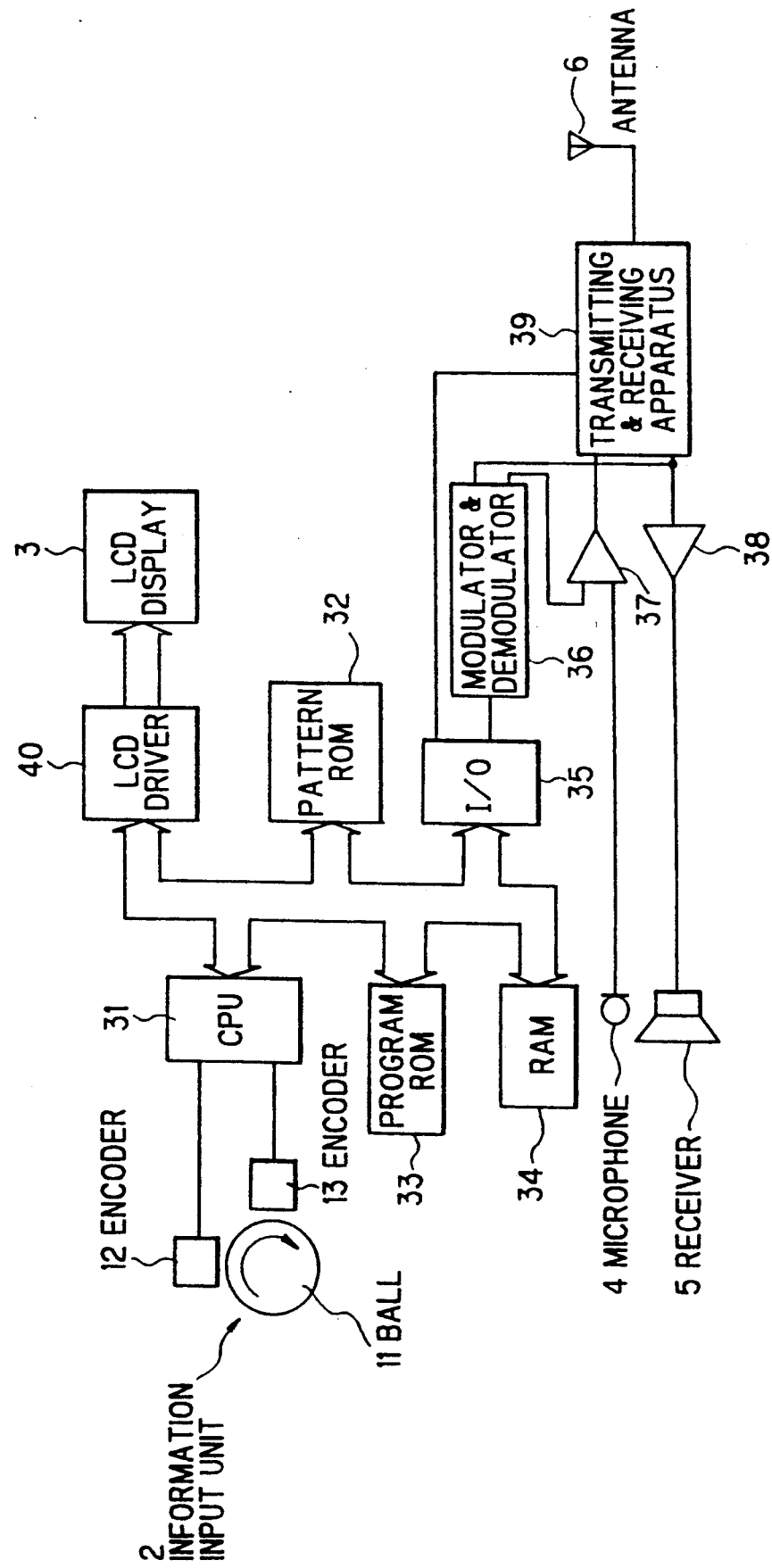
FIG. 3 is a block diagram showing the portable radio telephone set in the preferred embodiment.

FIG. 3 shows the portable radio telephone set in the preferred embodiment which comprises a CPU 31 including an arithmetic logic unit, a letter counter, a register set, etc. for receiving the ball moving distance signals generated in the rotary encoders 12 and 13 by cooperation with the ball 11. A pattern ROM 32 stores patterns of numerical and alphabetical letters. A program ROM 33 stores a program, by which a telephone number signal and a station name signal of a called party are generated. A RAM 34 is employed for storing a telephone number of a called party and a station name corresponding to the telephone number in the form of pattern signals. The RAM 34 comprises a first region for storing data temporarily and a second region for storing data in non-volatile mode. Also shown are an I/O port 35, a modulator/demodulator 36 for modulating the telephone number and station name signals of the called party and demodulating a signal received from another station, an amplifier 37 for amplifying the modulated signal and a signal supplied from the microphone 4, an amplifier 38 for amplifying the received signal supplied to the receiver 5, a transmitting and receiving apparatus 39 for transmitting the modulated signal to air by the antenna 6 and receiving a signal received by the antenna 6, and an LCD driver 40 for driving the LCD display 3 to display a telephone number and a station name of the called party, etc.

Figure 4A:
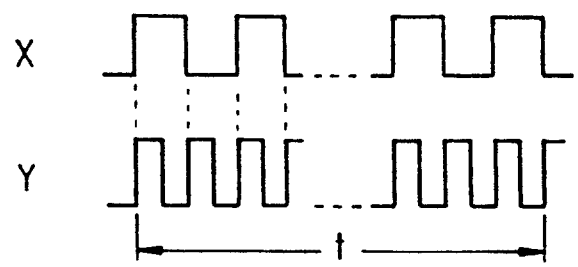
FIGS. 4A and 4B are explanatory diagrams showing output signals of encoders in the portable radio telephone set in the preferred embodiment, and a pattern defined by the output signals, respectively.
Figure 4B:
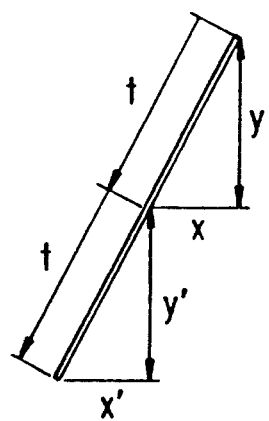

In operation, a calling party holds the portable radio telephone set by a hand, as shown in FIG. 1, and presses the ball 11 of the information input unit 2 on an appropriate plane such as a desk to draw numerical or alphabetical letters such as a telephone number or a station name of a called party. Then, the ball 11 is rotated to rotate the rollers 14 and 15, rotating speeds of which are proportional to ball moving distances of the X- and Y-directions. Consequently, the ball moving distance signals X and Y having pulse numbers proportional to the X- and Y- ball moving distances are generated for a predetermined time t in accordance with the light shielding effect by the teeth on the outer peripheries of the gears 18 and 19 in the rotary encoders 12 and 13, respectively, as shown in FIG. 4A, and are supplied to the CPU 31, in which the pulse numbers x and y are counted. The pulse number counting operation is sequentially continued for the successive predetermined time t. The counted values x, x' ... and y, y' ... are stored into the RAM 34 to provide a pattern of a letter, as shown in FIG. 4B. This pattern is compared with a pattern stored previously in the pattern ROM 32, so that the input pattern is determined to be a letter which is equal to a letter defined by the pattern in the pattern ROM 32, when the patterns coincide with each other. This determined letter is displayed on the display 3 by the LCD driver 40. In FIG. 1, the displayed telephone number is "123-4567".

Figure 5A:
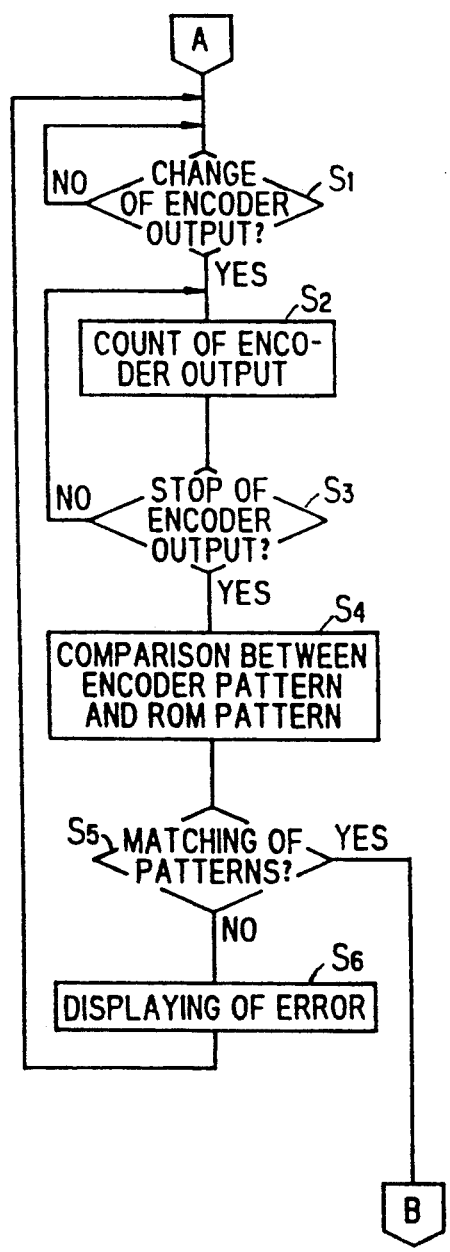
FIGS. 5A to 5C together form a flow chart explaining operation of the portable radio telephone set in the preferred embodiment.

This operation will be explained in more detail in conjunction with FIGS. 5A to 5C.

The ball moving distance signals X and Y are supplied from the X- and Y- encoders 12 and 13 to the CPU 31 (step $S_1$), and the pulse numbers x, x' ... and y, y' ... of the ball moving distance signals X and Y are counted (step $S_2$). When the ball moving distance signals X and Y are ceased to be supplied to the CPU 31 (step $S_3$), a pattern defined by the counted pulse numbers x, x' ... and y, y' ... of the ball moving distance signals X and Y is compared with a pattern in the pattern ROM 32 (step $S_4$). When the matching of both patterns is detected in this comparison (step $S_5$), a content of the letter counter is checked (step $S_7$). On the other hand, when the patterns do not coincide, an error is displayed on the display 3 (step $S_6$). When the letter counter is zero, an input letter is checked as to whether it is numerical or alphabetical (step 8). The first input letter "1" is a numerical letter, so that a dial input mode is set and the input letter is displayed on the LCD display 3 (step $S_{12}$). As a result, the content of the letter counter is increased by one (step $S_{13}$). Thus, the input of the telephone number "123-4567" is carried out. In this dial input mode, the registration mode is not set (step $S_{14}$ following step $S_7$), because the telephone number "123-4567" is not completely supplied to the CPU 31. The second to final (seventh) letter "2" to "7" are numerical (step $S_{15}$), so that these letters are in turn displayed on the LCD display 3 (step $S_{12}$), and the letter counter is increased one by one (step $S_{13}$) to finally count "7". When the telephone number "123-4567" is completely dialed by manipulating the main body 1 having the information input unit 2, the letter "M" is then drawn to be supplied to the CPU 31. As a result, the telephone number "123-4567" is transferred to be stored into the first region of the RAM 34 (step $S_{16}$), so that the registration mode is set (step $S_{17}$).

Figure 5B:
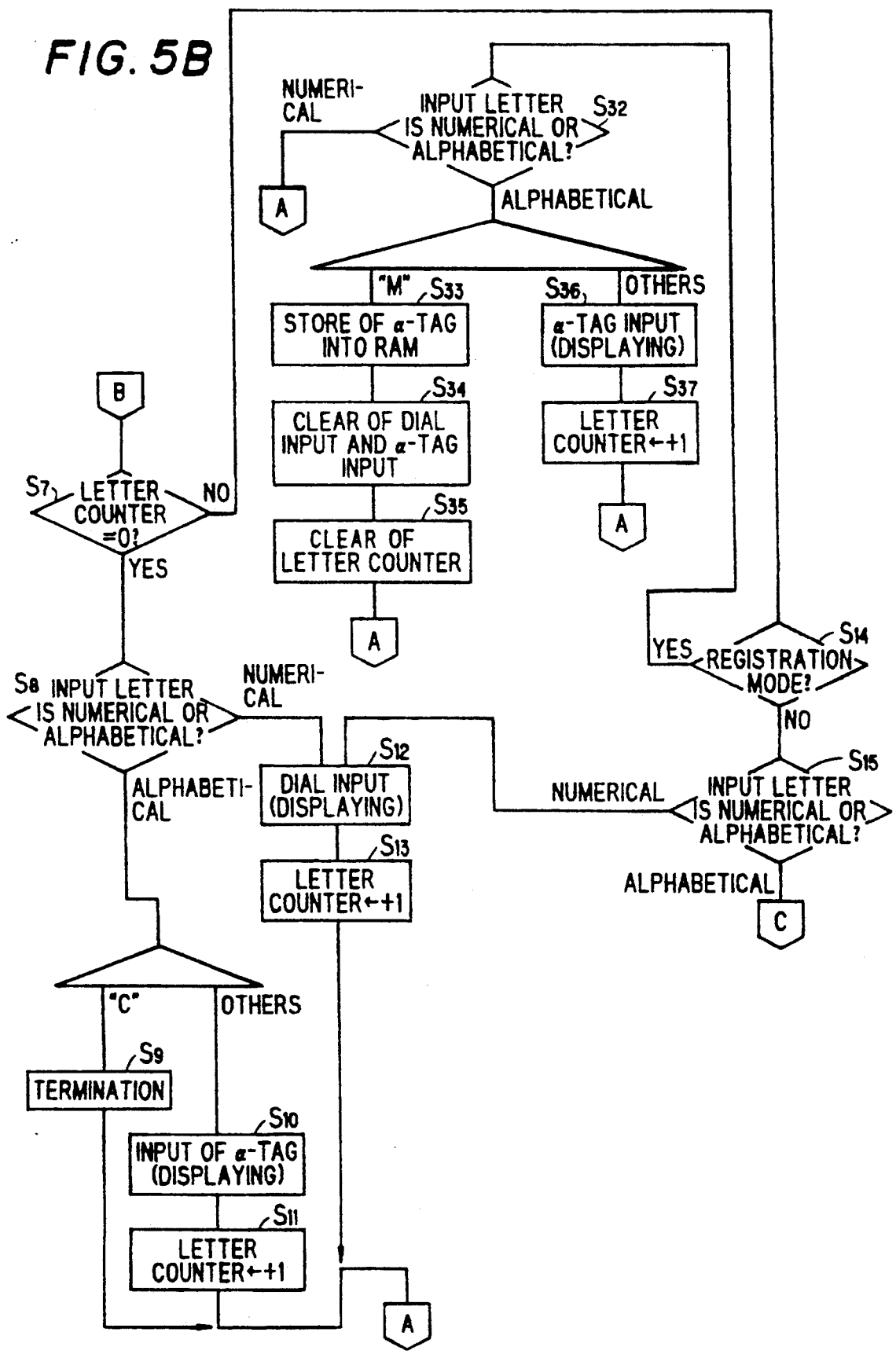
Figure 5C:
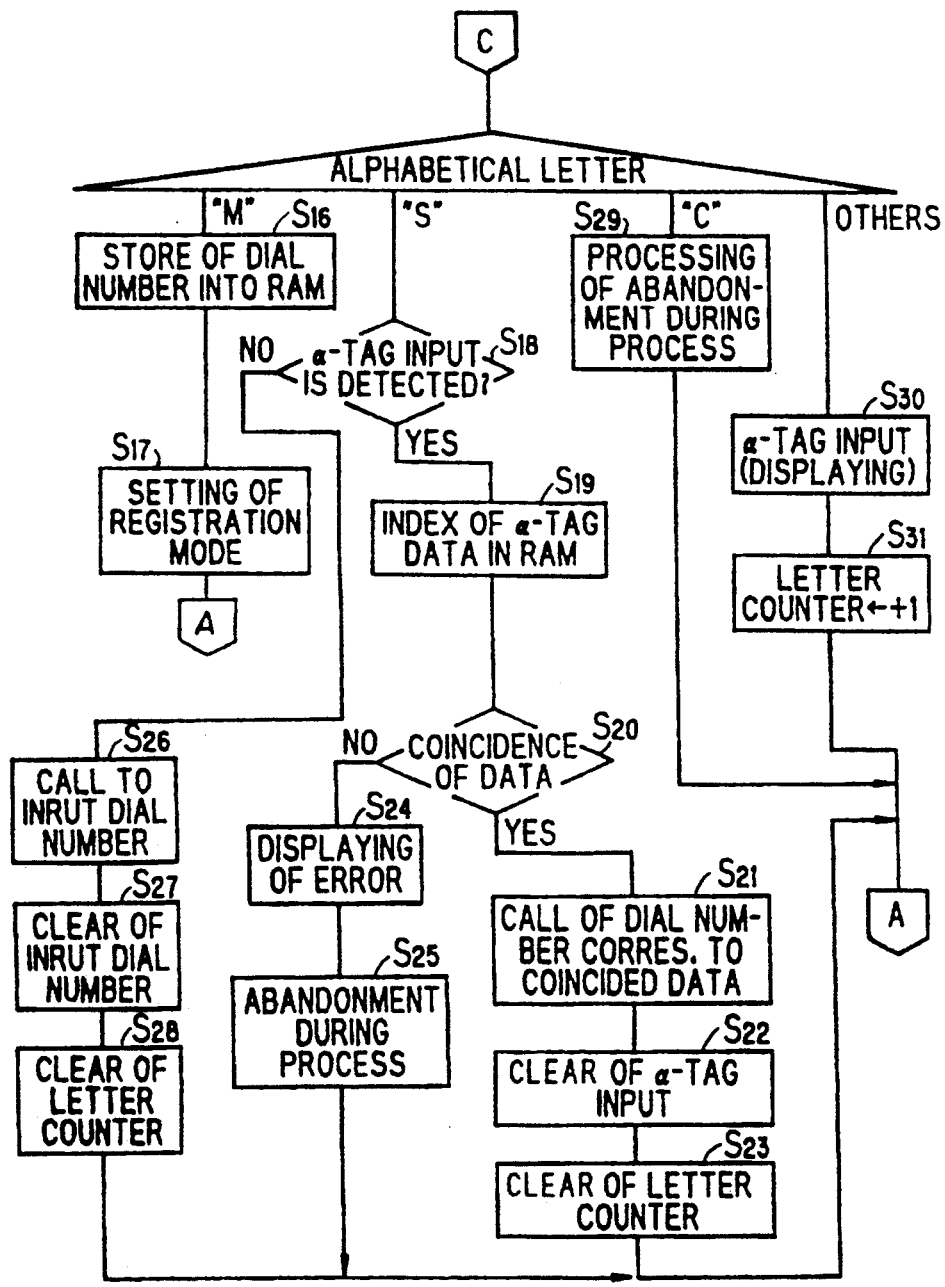

Next, letter patterns of the station name "NIPPON DENKI" of the called party which is defined "α-TAG" in the flow chart as shown in FIG. 5B are supplied to the CPU 31. The input letters are alphabetical (step $S_{32}$ following step $S_{14}$), so that the input letters are in turn displayed on the LCD display 3 (step $S_{36}$), and the letter counter is increased one by one to finally count "18" ("7" + "11") (step $S_{37}$). When the input of the station name is completed, the letter "M" is then drawn to be supplied to the CPU 31, into the first region of the RAM 34 (step $S_{33}$) together with the telephone number. When the station name is stored in the first region of the RAM 34 following the storing of the telephone number, these contents are cleared in the first region of the RAM 34 to be transferred into the second region of the RAM 34 (step $S_{34}$). Thus, the telephone number "123-4567" of the called party and the station name "NIPPON DENKI" corresponding thereto are stored into the second region of the RAM 34. At the same time, the letter counter is cleared (step $S_{35}$).

In this state, when the called party's station name "NIPPON DENKI", and then the letter "S" is drawn to be supplied to the CPU 31 by use of the information input unit 2, the station name is stored in the first region of the RAM 34 (step $S_{10}$), the letter counter is increased one by one to finally count "11" (step $S_{11}$), and the second region of the RAM 34 is accessed for the index of "NIPPON DENKI" and for the check of data coincidence (step $S_{19}$ and $S_{20}$ following step $S_{18}$), so that the telephone number "123-4567" is read from the second region from the RAM 34 to be modulated in the modulator/demodulator 36 and amplified in the amplifier 37. Then, the amplified telephone number is transmitted from the transmitting and receiving apparatus 39 through the antenna 6 to air (step $S_{21}$). Then, the called party's station name stored in the first region of the RAM 34 is cleared (step $S_{22}$), and the content "11" of the letter counter which is increased by the input of "NIPPON DENKI" (step $S_{30}$ and $S_{31}$) is cleared (step $S_{23}$). On the other hand, when the data coincidence is not detected (step $S_{20}$), "error" is displayed on the LCD display 3 (step $S_{24}$), and the telephone number calling operation is then abandoned (step $S_{25}$).

Here, it is assumed that the telephone number "123-4567" and the station name corresponding thereto are not in advance stored in the second region of the RAM 34. In such a case, the telephone number "123-4567" and then the letter "S" are drawn on the desk to be supplied to the CPU 31 by use of the information input unit 2, so that the telephone number signal which is modulated in the modulator/demodulator 36 is transmitted from the transmitting and receiving apparatus 39 through the antenna 6 to air (step $S_{26}$ following step $S_{18}$). Then, the telephone number stored in the first region of the RAM 34 is cleared (step $S_{27}$), and the content "7" of the letter counter is cleared (step $S_{28}$).

Otherwise, when the letter "C" is supplied to the CPU 31 during the process, in which a part or whole of the telephone number or the station name corresponding thereto is supplied to the CPU 31, the process is abandoned (step $S_{29}$). On the other hand, when the letter "C" is supplied to the CPU 31 in accordance with the termination of communication (telephone conversation), the connection is turned off between the calling and called parties (step $S_9$). That is, as a result of the letter input "C", all states are reset to provide an initial state.

In this operation, instructions such as the completion of information input, the calling from a calling party to a called party, and the cancellation of input information are carried out by the letters "M", "S" and "C" symbols "(a)", "&", etc., greek letters "α", "β", "γ", etc., so that the letters "M", "S" and "C" can be used for the station name of a called party.

In the preferred embodiment, although the information unit comprises the ball and the X- and Y-encoders, it may comprise a scanning apparatus composed of CCD devices for reading a telephone number or a station name of a called party written on a paper, a sheet, etc.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A portable radio telephone set, comprising:
   a ball rotating to be moved on a surface of an article by manipulation of an operator;
   first and second encoders for generating first and second signals of ball moving distances in first and second directions orthogonal to each other;
   means for generating pattern signals of alphanumeric letters in accordance with said first and second signals;
   a first memory for storing patterns of alphanumeric letters;
   a second memory having a first region for storing said pattern signals temporarily and a second region for storing said pattern signals transferred from said first region in non-volatile mode;
   means for comparing a pattern defined by said pattern signals with a pattern of said first memory to generate a coincidence signal;
   means for modulating a telephone number obtained from patterns determined by said coincidence signals; and
   means for transmitting said modulated telephone number to air by an antenna.

2. A portable radio telephone set, according to claim 1, wherein:
   said second memory stores a telephone number of a called party and a station name corresponding to said telephone number in the form of said pattern signals.

3. A portable radio telephone set, according to claim 1, wherein:
   said ball is partly protruded out of a first end of a pencil shaped main body;
   said first and second encoders, said generating means, said first memory, said second memory, said comparing means, said modulating means, and said transmitting means are contained in said pencil shaped main body; and
   said antenna is provided on a top of a second end of said pencil shaped main body.

4. A portable radio telephone set, comprising:
   means for scanning alphanumeric letters defined on a sheet material to generate pattern signals of said letters;
   a first memory for storing patterns of letters;
   a second memory having a first region for storing said pattern signals temporarily and a second region for storing said pattern signals transferred from said first region in non-volatile mode;
   means for comparing a pattern defined by said pattern signals with a pattern of said first memory to generate a coincidence signal;
   means for modulating a telephone number obtained from patterns determined by said coincidence signals; and
   means for transmitting said modulated telephone number to air by an antenna.

5. A portable radio telephone set, according to claim 4, wherein:
   said second memory stores a telephone number of a called party and a station name corresponding to said telephone number in the form of said pattern signals.

6. A portable radio telephone set, according to claim 4, wherein:
   said scanning means is provided at a first end of a pencil shaped main body;
   said first and second encoders, said generating means, said first memory, said second memory, said comparing means, said modulating means, and said transmitting means are contained in said pencil shaped main body; and
   said antenna is provided on a top of a second end of said pencil shaped main body.

7. A portable radio telephone set, comprising:
   means for generating pattern signals representative of alphanumeric letters indicative of a telephone number;
   a memory for storing patterns representative of alphanumeric letters;
   means for comparing said pattern signals and said stored patterns to generate a coincidence signal when said pattern signal corresponds to said stored pattern; and
   means for transmitting a telephone number signal in response to said coincidence signal;
   wherein said generating means, said memory, said comparing means, and said transmitting means are contained in a main body having a pencil shape, said main body being held by a hand of an operator;
   said generating means including a ball partly protruding out of a first end of said main body and rotating on a plane, means for detecting moving distances of said ball in first and second directions orthogonal to each other, and means for defining a pattern of a letter by said moving distances of said ball; and
   said transmitting means is connected to an antenna provided on a second end of said main body.

8. A portable radio telephone set, according to claim 7, wherein:
   said detecting means includes first and second photo-interruptors each having a light-passing and shielding gear which is rotated in a corresponding one of said first and second directions by said ball, said gear being positioned between light emitting and receiving devices.

* * * * *